United States Patent [19]

Kato

[11] Patent Number: 5,543,847
[45] Date of Patent: Aug. 6, 1996

[54] PICTURE CODING AND DECODING METHOD FOR RANDOM ACCESSING

[75] Inventor: Motoki Kato, Kanagawa, Japan

[73] Assignee: Sony Corporation, Tokyo, Japan

[21] Appl. No.: 165,317

[22] Filed: Dec. 13, 1993

[30] Foreign Application Priority Data

Dec. 14, 1992 [JP] Japan .................................. 4-333142

[51] Int. Cl.$^6$ ........................................................ H04N 7/32
[52] U.S. Cl. ............................................. 348/415; 348/409
[58] Field of Search ........................................ 348/384, 409, 348/410, 415; 358/335; H04N 7/137

[56] References Cited

U.S. PATENT DOCUMENTS

| | | | |
|---|---|---|---|
| 4,982,285 | 1/1991 | Sugiyama | 348/415 |
| 5,103,307 | 4/1992 | Sugiyama | 348/410 |
| 5,111,292 | 5/1992 | Kuriacose et al. | 348/384 |
| 5,185,819 | 2/1993 | Ng et al. | 348/409 |
| 5,191,436 | 3/1993 | Yonemitsu | 358/335 |
| 5,212,549 | 5/1993 | Ng et al. | 348/409 |
| 5,231,384 | 7/1993 | Kuriacose | 348/409 |
| 5,249,048 | 9/1993 | Sugiyama | 348/415 |
| 5,267,037 | 11/1993 | Sugiyama | 348/415 |
| 5,293,229 | 3/1994 | Iu | 348/415 |
| 5,329,365 | 7/1994 | Uz | 348/415 |

Primary Examiner—Howard W. Britton
Assistant Examiner—Richard Lee
Attorney, Agent, or Firm—William S. Frommer; Alvin Sinderbrand

[57] ABSTRACT

A picture encoding and decoding technique for enabling random accessing. Using a prediction picture signal formed by only locally decoded signals of an intra-coded first field, a second field making up a frame along with the above-mentioned first field is encoded. If the second field making up a frame along with the above-mentioned first field is encoded using a prediction picture signal formed from the local decoded signal of a field belonging to a temporally previous group, a flag indicating that encoding has been made using the local decoded signal of the field belonging to the temporally previous group is encoded.

26 Claims, 8 Drawing Sheets

```
group_of_pictures 0 {                                          32 bslbf
    group_start_code                                           25
    time_code                                                  ]
    closed_gop                                                 ]
    broken_link
    next_start_code 0
    if(nextbits0 == extension_start_code) {
        extension_start_code                                   32 bslbf
        closed_prediction_flag                                 1 bit
        reserved_bits                                          7 bit
        while(nextbits0!= '0000 0000 0000 0000 0000 0001') {
            group_extension_data                               8
        }
        next_start_code 0
    }
    if(nextbits0 == user_data_start_code) {
        user_data_start_code                                   32 bsblf
        while(nextbits0!= '0000 0000 0000 0000 0000 0001') {
            user_data                                          8
        }
        next_start_code 0
    }
    do {
        picture 0
    } while(nextbits0 == picture_start_code)
}
```

FIG.7

PICTURE CODING AND DECODING METHOD FOR RANDOM ACCESSING

BACKGROUND OF THE INVENTION

This invention relates to an information recording method and an information reproducing method employing a storage type moving picture medium, such as an optical disc or a magnetic tape, a method and apparatus for picture encoding and decoding which may be applied to a teleconferencing system, a moving picture telephone system or an information transmission/reception system for a telecasting equipment, and a picture recording medium.

Representative of the motion compensation prediction coding add decoding methods is a standard system for storage type moving picture coding, known as MPEG1, formulated at ISO-IEC/JTC1/SC2/WG11, commonly termed Motion Picture Experts Group (MPEG).

With the MPEG1, a number of moving pictures a unit are grouped into a group of pictures (GOP). A constructional example of GOP is shown in FIG. 1, in which there are three types of pictures in the GOP, that is an I-picture or intra-coded picture, a P-picture or a predictive-coded picture and a B-picture or a bi-directionally predictive-coded picture. The I-picture is an intra-frame coded picture. The P-picture is an inter-frame coded picture, that is a picture obtained by motion prediction from the recently decoded and reproduced past I-picture or the P-picture and encoding of the prediction error. The B-picture is a bi-directionally prediction-coded picture obtained by motion prediction from both the past reproduced picture and a future picture yet to be reproduced and encoding of the prediction error. The GOP is made up of one or more I-picture(s) and 0 or plural non-I picture(s). In FIG. 1, the I-picture, P-picture and the B-picture are indicated by letters I, P and B, respectively. Besides, in FIG. 1, arrows interconnecting the pictures denote the directions of motion prediction.

In addition, in MPEG1, GOP headers 1, 2, 3, ... N are appended to GOP 1, GOP 2, GOP 3, ... GOP N, as shown in FIG. 2, for enabling random accessing (reproduction from an arbitrary point) on the GOP basis. Consequently, the picture decoding device detects a GOP start code of a designated GOP in a coded input string of data, or an input bitstream, and causes the decoding to be started at the leading I-picture of the GOP to enable the reproduction from an arbitrary point in the sequence of moving pictures.

It is noted that two flags, namely a closed GOP flag and a broken link GOP flag, are appended to the GOP header.

The closed GOP flag is set during encoding for indicating that a P-picture of a past GOP, which is a P-picture indicated by hatching in the case of FIG. 1, is not used for predicting first plural B-pictures, herein B-pictures of two frames. A GOP with the closed GOP flag set is a completely independent GOP.

The broken link flag is set when a bitstream other than a closed GOP is sliced and linked by editing. Thus, when a broken link flag is set for a GOP, the picture decoding device recognizes that several leading B-pictures cannot be displayed for the GOP.

These two flags are relevant to several leading B-pictures of a given GOP. If random accessing is had to a designated GOP, that is if the reproduction is made at an arbitrary point in the sequence of moving pictures, the leading B-picture(s) cannot be displayed in the worst case. However, reproduction may be made as from the I-pictures.

As for the detailed code and the grammar of the bitstream concerning the GOP, reference is had to ISO/IEC 11172-2 which is a standard material of MPEG1.

In U.S. Pat. No. 5,191,436, there is disclosed a technique of setting an edit flag when a bitstream is sliced and sliced portions are linked together by way of editing.

Recently, a system of encoding interlaced pictures, such as pictures of the NTSC or PAL system for television, is under investigation in the MPEG2 formulated in the wake of MPEG1. With the MPEG2, the processing units of the pictures to be encoded are adaptively changed over from the frame-structure unit to the field-structure unit or vice versa to produce a plurality of decoded and reproduced past pictures.

With the MPEG2, similarly to the MPEG1, there are three pictures in a GOP, that is an I-picture, a P-picture and a B-picture, each of which may be of a frame structure or a field structure.

If random accessing is made on the GOP basis with the MPEG2, the following problem is met when the leading I-picture of a GOP is of the field structure, That is, if a picture p13 now to be encoded is of a field structure, motion prediction may be made from decoded and reproduced past two fields, namely a field p06 and a field i12, as shown in FIG. 3, If the prediction is made from the field p06, the GOP 1 ceases to be independent, such that random accessing cannot be made to the GOP 1. The reason is that, when random accessing is had to the GOP 1, the field p06, which should be referred to during motion compensation required for reproducing the field p13, is not yet reproduced. In FIG. 3, i, p and b denote an I-picture, a P-picture and a B-picture, respectively, while slanted broken lines indicate lines of interruption between neighboring GOPs.

SUMMARY OF THE INVENTION

In view of the above-depicted status of the art, it is an object of the present invention to provide a picture encoding and decoding method and apparatus and a picture recording medium in which random accessing may be made to any GOP.

It is another object of the present invention to provide a picture encoding and decoding method in which, when encoding a P-picture belonging to a GOP, it can be recognized whether or not random accessing may be had to such GOP.

It is a further object of the present invention to provide a picture encoding method and apparatus in which random accessing may be had from a frame a field of which is an intra-coded field.

Each of the foregoing and additional objects are achieved by the provision of a picture encoding and decoding method for random accessing according to the present invention.

The present invention provides a picture encoding method comprising the steps of generating a predicted picture signal using only a locally decoded signal of an intra-coded first field, taking a difference between the predicted picture signal and a signal based on a second field making up a frame along with the first field for generating a difference signal, and encoding the difference signal.

The present invention also provides a picture encoding method comprising the steps of generating a predicted picture signal using a locally decoded signal of an intra-coded first field and a locally decoded signal of a field belonging to a temporally previous field, taking a difference between the predicted picture signal and a signal based on a second field making up a frame along with the first field for generating a difference signal, and encoding the difference signal and flag indicating whether or not encoding is made using the locally decoded signal of the field belonging to the temporally previous field.

The present invention also provides a picture decoding method comprising the steps of generating a predicted picture signal using only a locally decoded signal of an intra-coded first field, and adding a signal based on an encoded signal of a second field making up a frame along with the first field to the predicted picture signal for decoding the second field.

The present invention also provides a picture decoding method comprising the steps of decoding a flag indicating whether or not encoding is made using a locally decoded signal of a field belonging to a temporally previous group, generating a predicted picture signal using only a locally decoded signal of an intra-coded first field if the flag indicates that encoding is not made using the locally decoded signal of the field belonging to the temporally previous group, and adding a signal based on an encoded signal of a second field making up a frame along with the first field to the predicted picture signal for decoding the second field.

The above and other objects, features and advantages of the present invention will be apparent from the following detailed description of preferred embodiments when read in conjunction with the accompanying drawings in which like reference numerals are used to identify the same or similar parts in the several views.

BRIEF DESCRIPTION OF THE DRAWINGS

FIG. 7 illustrates a bitstream syntax on a GOP layer.

DETAILED DESCRIPTION OF THE INVENTION

Figure 1:
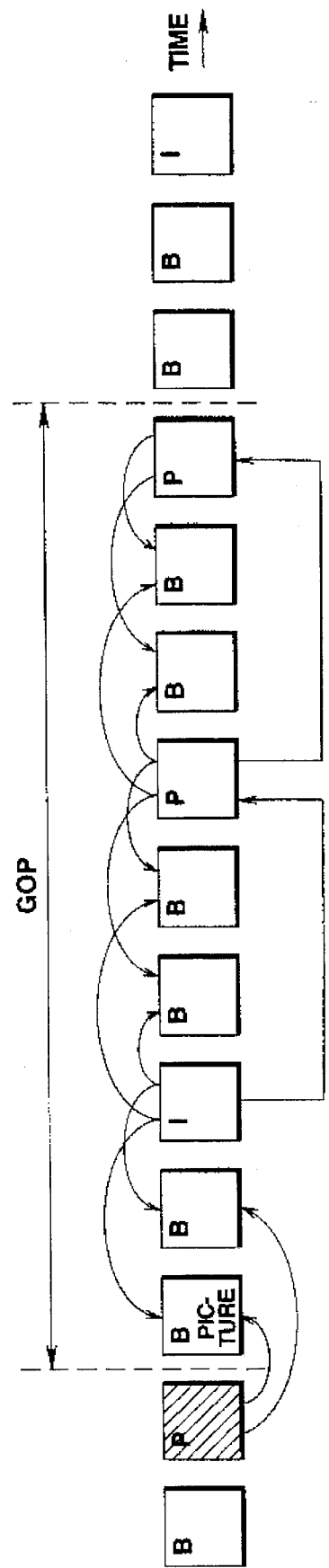
FIG. 1 illustrates an example of an array of pictures of different types in a GOP.
Figure 2:
FIG. 2 illustrates GOP headers.
Figure 3:
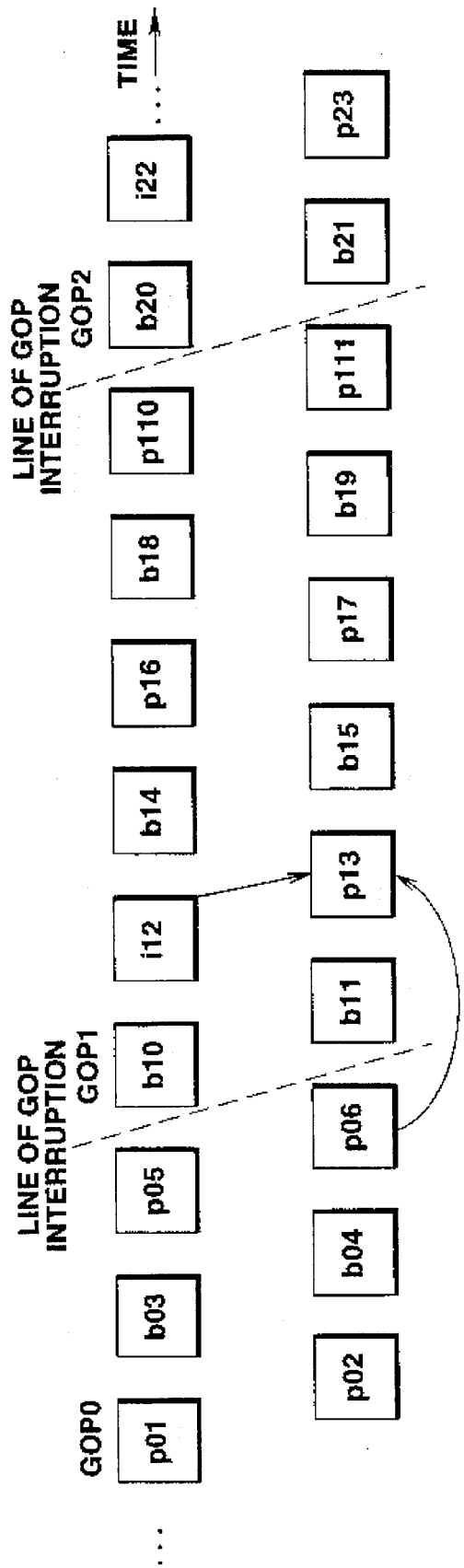
FIG. 3 illustrates an example of an array of pictures of different types in a GOP having a field-based picture structure.

Referring to the drawings, a preferred embodiment of the present invention is explained in detail.

The picture encoding method according to the present invention is the picture encoding method to which the above-mentioned MPEG2 is applied and which consists in encoding a difference signal between an original picture and a decoded past picture. With the present encoding method, a random accessibility indicating flag is provided, that is appended, to a header of the GOP as a flag indicating whether or not, during encoding of a P-picture belonging to the current GOP, a decoded picture belonging to the past GOP has been used for encoding. Besides, for encoding a P-picture belonging to the current GOP with the picture encoding method of the present embodiment, prediction is made only from the decoded picture belonging to the current GOP. In other words, prediction from the picture belonging to the past GOP is inhibited at all times.

Figure 4:
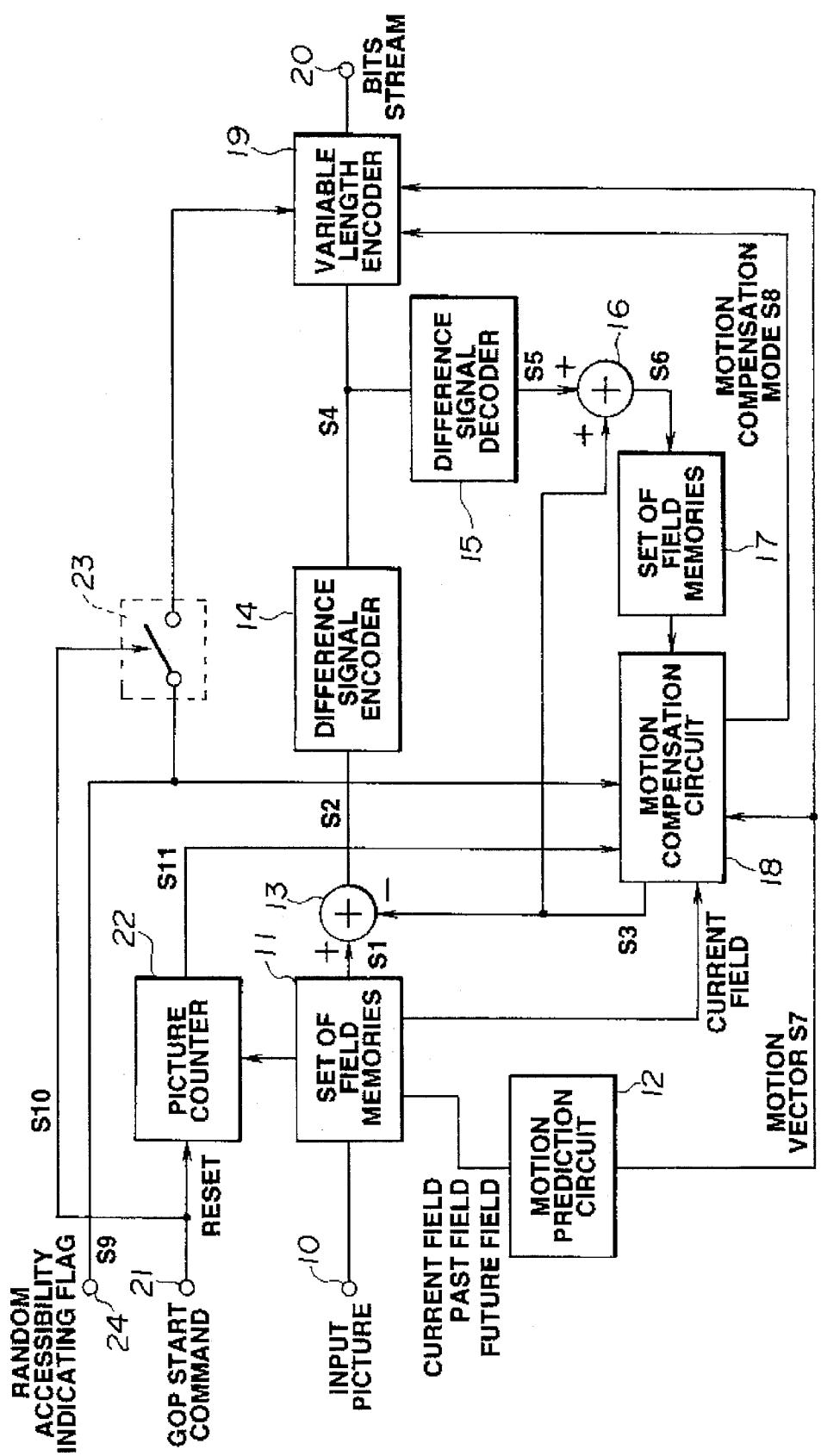
FIG. 4 is a schematic block circuit diagram showing a picture encoding device embodying the present invention.

Referring to FIG. 4, the picture encoding device of the present embodiment, in which the picture encoding method according to the present embodiment is applied, is made up of a set of field memories 11 as storage means for storing an input picture supplied via a moving picture input terminal 10, a subtractive node 13 for forming a difference signal, that is a block difference signal S2, between a picture signal outputted from the set of field memories 11, that is a block picture signal S1, and a prediction picture from a motion compensation circuit 18 as later described, that is a block picture signal S3, a difference signal encoding unit 14 inclusive of transformation means for transforming the block difference signal S2 into preset transformation coefficients, that is DCT coefficients as later described, and quantization means for converting the transformation coefficients for outputting quantized coefficients, a difference signal decoding unit 15 inclusive of inverse quantization means for inverse quantization of the quantization coefficients (an encoded signal S4) for outputting inverse quantization coefficients and inverse transformation means for inverse transformation of the inverse quantization coefficients for forming decoded picture signals (a block reproduction difference signal S5), an additive node 16 for adding the block reproduction difference signal S5 to the prediction picture (block picture signal S3) from a motion compensation circuit 18 as later described, and a variable length encoding unit 19 for variable length encoding, along with the above-mentioned quantization coefficients (encoded signal S4), a flag (random accessibility indicating flag S9) indicating whether or not the decoded picture belonging to the past GOP is used for encoding the P-picture of the current GOP.

Referring to FIG. 4, the picture encoding device of the present embodiment, shown in FIG. 4, that is the motion-compensation prediction coding device to which the MPEG 2 is applied, is explained in detail.

In FIG. 4, picture signals entered via a moving picture input terminal 10 are supplied to and stored in the set of field memories 11. The stored picture signals are transmitted on the field basis to a motion prediction circuit 12 and to a motion compensation circuit 18.

The motion prediction circuit 12 performs motion prediction of pixels in a picture of the current field, that is the field being encoded, on the picture signals stored in the set of field memories 11, by having reference to a past picture, that is a past field, and a future picture, that is a future field. The motion prediction is performed by block matching between pixel signals of a block consisting e.g. of 16×16 pixels in the current picture now to be encoded and past or future pictures to which reference is to be had. Besides, the motion prediction circuit 12 transmits a block position in the reference picture having the least prediction error, as obtained by the block matching to the motion compensation circuit 18, as a motion vector S7.

The motion compensation circuit 18 instructs the block picture signal S3 located at an address as designated by the motion vector S7 to be outputted from the set of field memories 17 in which the previously decoded and reproduced pictures are stored. Besides, the outputting of the block picture signal S3 from the motion compensation circuit 18 represents an adaptive operation such that an optimum one of the following four modes may be switchingly selected on the block basis.

These four modes comprise a motion compensation mode from the past reproduced picture, a motion compensation mode from a picture to be reproduced in future, a motion compensation mode from both the picture reproduced in the past and the picture to be reproduced in future, that is a mode of performing a 11near operation, such as calculation of a mean value, on a reference block from the picture reproduced in the past and a reference block from the picture to be reproduced in future, from pixel to pixel, and a mode devoid of motion compensation, that is an intra-picture coding mode.

In switchingly selecting one of these modes, such a mode is selected which will give the pixel-based least value of the sum total of absolute values of differences between the block pixel signals of the current picture and the respective block pixel signals outputted for the four modes. The mode selected in this manner is outputted as a motion compensation mode signal S8.

On the other hand, a pixel-based difference value between the block pixel signal S1 of the current picture as supplied from the set of field memories 11 and the block pixel signal S3 as supplied from the set of field memories 17 via the motion compensation circuit 18 is obtained by the subtractive node 13 and the resulting block difference signal S2 is supplied to the difference signal encoding unit 14. However, as for the blocks of the P-picture and the B-picture when the intra-coding mode is selected, and the totality of blocks of the I-picture, the block pixel signal S1 itself is supplied as the block difference signal S2 to the difference signal encoding unit 14, while calculation of the difference signal between the block pixel signal S1 and the block pixel signal S2 is not made.

The difference signal encoding unit 14 transforms the block difference signal S2 into a predetermined transformation coefficient and quantizes the resulting coefficient to output the resulting data as the encoded signal S4.

The encoded signal S4, as well as the motion vector S7 from the motion prediction circuit 12 and a motion compensation mode S8 from the motion compensation circuit 18, is variable length encoded, such as with a Huffman code, by the variable length encoder 19. The resulting data is outputted as a bitstream at an output terminal 20.

The coded signal S4 is also supplied to the difference signal decoding unit 15 which inverse-quantizes the encoded signal S4 and performs inverse transformation, that is a counterpart operation of the transformation into the pre-set transformation coefficients, on the resulting inverse-quantized coefficients, by way of decoding, for forming a block reproduction difference signal S5.

Meanwhile, the difference signal encoding unit 14 may be formed by a discrete cosine transformation unit (DCT unit) for transforming the block difference signal S2 into pre-set transformation coefficients, and a quantizer for quantizing the resulting output coefficients (DCT coefficients). Consequently, the difference signal decoding unit 15 in such case may be formed by an inverse quantizer and an inverse discrete cosine transformation unit (IDCT unit) for inverse transformation of the DCT coefficients.

The block reproduction difference signal S5 from the difference signal decoding unit 15 is supplied to the additive node 16, in which the block reproduction difference signal S5 and the block picture signal S3 outputted from the motion compensation circuit 18 are added from pixel to pixel. As a result thereof, a block replay signal S6 is generated by the additive node 16, which is stored in a designated one of field memories of the set of field memories 17. The addition of the block reproduction signal S5 and the block pixel signal S3 is not performed for the blocks of the P-picture and the B-picture in case the intra-coding is selected and for the totality of the blocks of the I-picture. Instead, the block reproduction difference signal S5 itself is transmitted as the block reproduction signal S6 to the set of field memories 17.

The above is the basic structure and operation of the picture encoding device (motion compensation and prediction coding device) according to the present embodiment.

The moving pictures are entered to the device of the present embodiment on the basis of the group of pictures (GOP).

The manner of motion compensation and prediction is hereinafter explained for such a case in which the GOP picture construction is of a GOP 1 shown at X in FIG. 5. Meanwhile, the processing for the first and second steps of the motion compensation and prediction are represented as Y and Z in FIG. 5, respectively. Each picture is of a frame- or field-based construction, and the I-, P- and B-pictures are represented by i, p and b, respectively. The definitions of the I-, P- and B-pictures are as given above. The arrows interconnecting the respective pictures and slanted broken lines in the drawing indicate the direction of motion prediction and the lines of interruption of the GOPs, respectively.

Figure 5X:
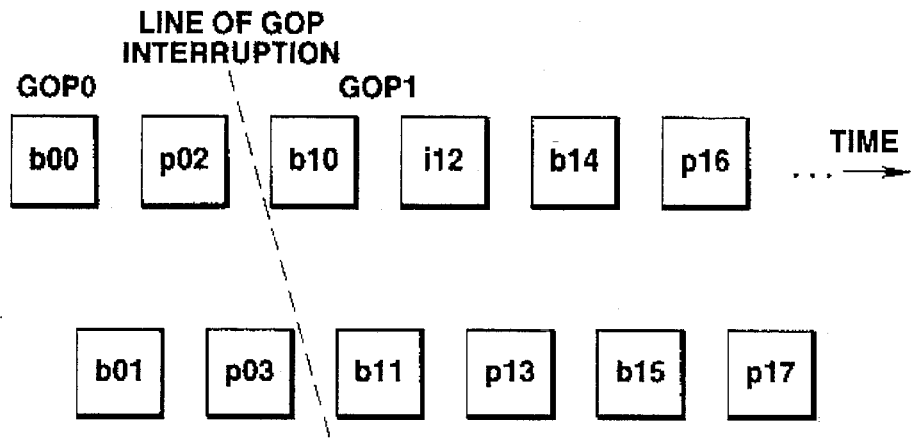
FIGS. 5X, Y and Z illustrate examples of prediction in the present embodiment.
Figure 5Y:
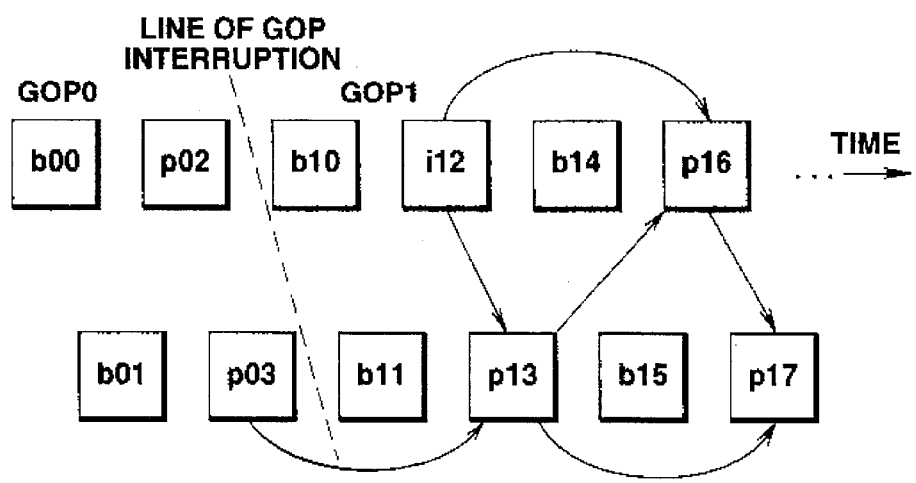
Figure 5Z:
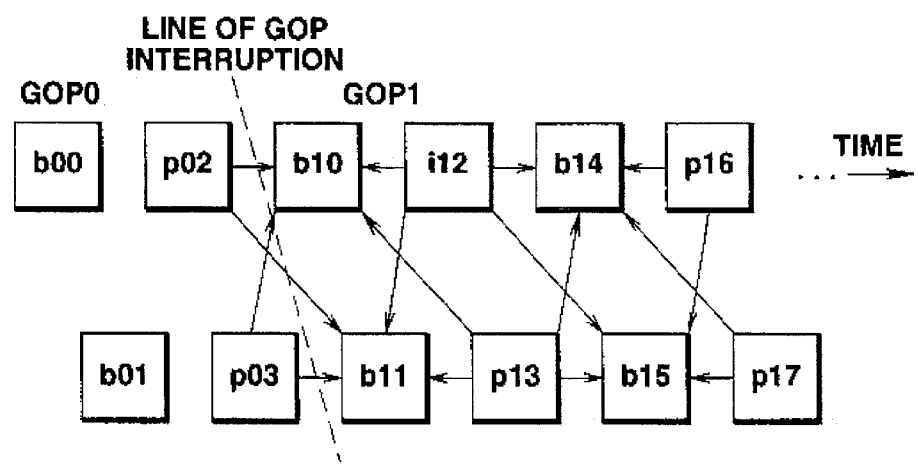

During the first step of the motion compensation and prediction shown at Y in FIG. 5, several past B-pictures, for example, are skipped to perform prediction from previously reproduced past I- or P-pictures. During the second step shown at Z in FIG. 5, predictive coding of a B-picture is performed by having reference to I- or P-pictures which are ahead and at back of the B-picture and which have already been encoded by the first step processing and reproduced.

Specifically, with the GOP 1 shown at X, Y and Z in FIG. 5, reference is had for example to a picture i12 and a picture p03 during the first stage of the motion prediction and motion compensation of the picture p13. The picture p03 belongs to a past GOP 0.

If it is desired at this time to enable random accessing to the GOP 1, that is to reproduce the GOP 1 beginning at an arbitrary position, reference to the picture p03 is inhibited. On the other hand, if random accessing to the GOP 1 is thought to be unnecessary, reference is had to the picture p03. It is when importance is to be attached to the picture quality when the reference is had to the picture p03.

Figure 6X:
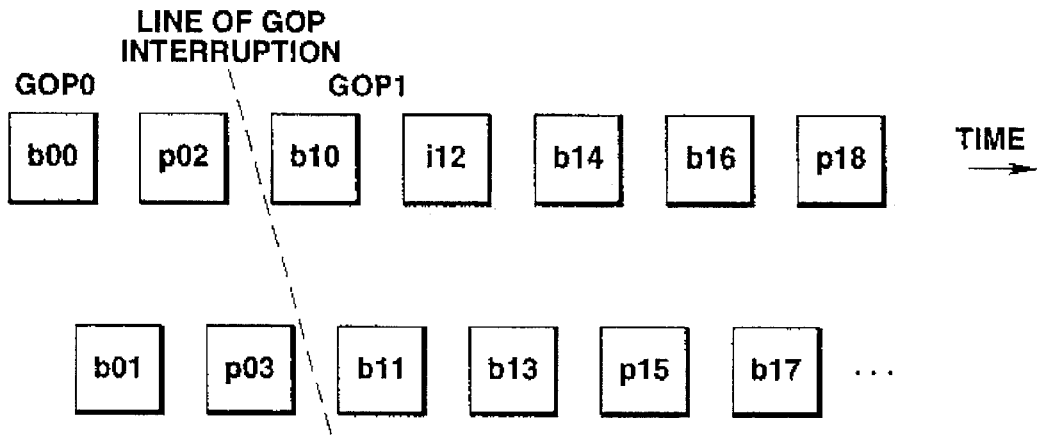
FIGS. 6X, Y and Z illustrate other examples of prediction in the present embodiment.
Figure 6Y:
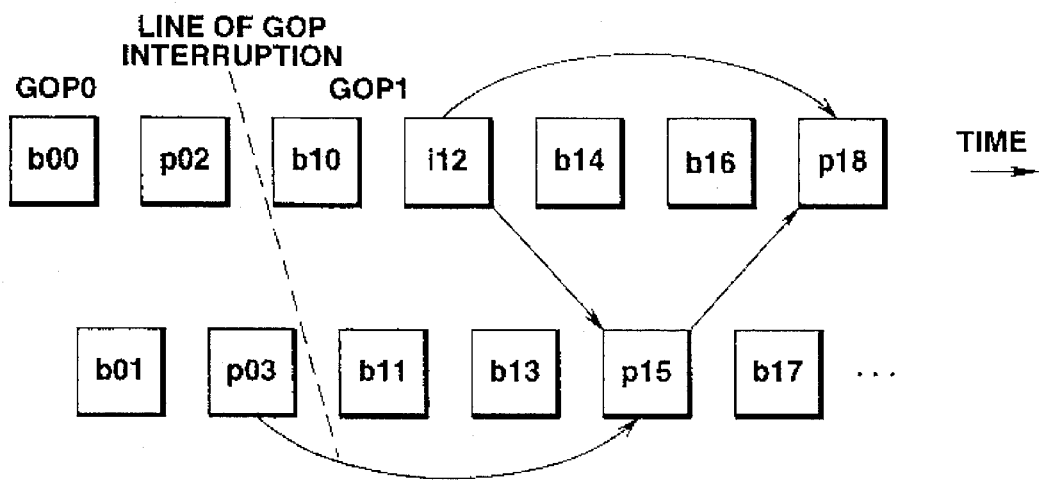
Figure 6Z:
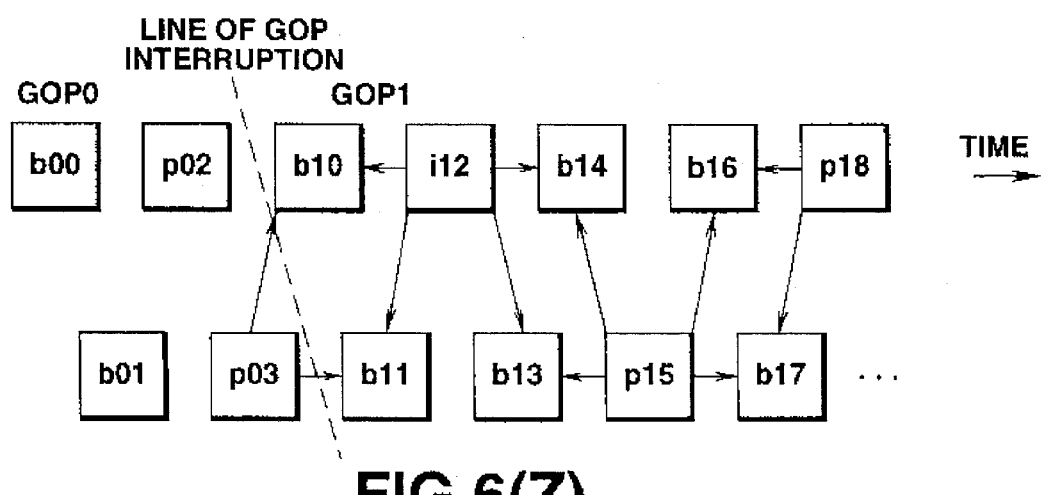

In the case of a GOP 1 shown at X in FIG. 6, as another example of the GOP construction, reference is had to a picture i12 and a picture p03 during the first stage of the motion prediction and motion compensation shown at Y in FIG. 6. The picture p03 belongs to a past GOP 0. In FIG. 6, Z indicates the second stage operation in each of X, Y and Z. The I-, P- and B-pictures are represented by i, p and b, respectively, as mentioned above. The arrows interconnecting the respective pictures and slanted broken lines in the drawing indicate the direction of motion prediction and the lines of interruption of the GOPs, respectively.

If it is desired at this time to enable random accessing to the GOP 1, that is to reproduce the GOP 1 beginning at an arbitrary position, reference to the picture p03 is inhibited. On the other hand, if random accessing to the GOP 1 is thought to be unnecessary, reference is had to the picture p03. It is when importance is to be attached to the picture quality when reference is had to the picture p03.

The construction and operation of the present picture encoding device is explained for the case in which the moving pictures are entered thereto on the basis of the GOPs as shown at X, Y and Z in FIGS. 5 and 6.

Returning to FIG. 4, when a GOP start instruction signal S10 is entered at a terminal 21, a random accessibility indicating flag S9, as pre-set depending on the conditions as to whether or not the random accessing to the GOP is to be enabled, is supplied at a terminal 24, along with the GOP start code. The random accessibility indicating flag is supplied to the variable length encoding unit 19 via a switch 23 which is changed over depending on the GOP start instruction signal S10.

Consequently, the variable length encoding unit 19 encodes the random accessibility indicating flag S9, along with the motion vector S7, motion compensation mode signal S8 and the coding signal S4, by variable length coding, for outputting a resulting bitstream.

FIG. 7 shows a bitstream syntax (the method of constructing a bitstream) on the COP layer.

Referring to FIG. 7, the random accessibility indicating flag is outputted with a "closed_ prediction_ flag" based on the above-mentioned syntax of the MPEG 1. On the other hand, "reserved_ bits" is present since group _extension _data are based on 8 bits and it becomes necessary to append seven meaningless bits. As to details of the other codes, reference is had to the standard material of MPEG 1.

Returning again to FIG. 4, when the COP Start instruction signal is entered at the input terminal 21, a picture counter 22 for counting the I-pictures or the P-pictures outputted from the set of field memories 11, is reset.

When the number of counts in the picture counter 22 is equal to "2", for example, a flag signal S11 is set for the motion compensation circuit 18. At this time, the motion compensation circuit 18 recognizes that the P-picture now to be encoded is a special P-picture, that is a P-picture having a picture of a directly previous GOP as a reference picture, that is a picture p13 shown at X, Y and Z in FIG. 5 and or a picture p15 shown at X, Y and Z in FIG. 6.

Besides, depending on the random access enable instruction signal S9, changeover is made at this time in the motion compensation circuit 18 between the prediction from the P-picture of the past GOP being feasible and the prediction from the P-picture of the past GOP being not feasible.

Meanwhile, there are occasions wherein prediction from the P-pictures belonging to past GOPs is inhibited at all times for enabling random accessing to all of the GOPs. Since there is no necessity at this time to append the random accessibility indicating flag S9 to the GOP header, it is not outputted from the variable length encoding unit 19.

The above is the description concerning the picture encoding device of the present embodiment.

The picture decoding method of the present embodiment is employed for decoding the encoded data generated by encoding difference signals between the original picture and past decoded picture, and consists in detecting, from the header of a given GOP, a flag (random accessibility indicating flag) indicating whether or not a P-picture of the GOP has been encoded using a decoded picture belonging to a past GOP, that is the GOP temporally preceding the given GOP, for deciding whether or not the P-picture of the current GOP has been encoded using the decoded picture belonging to such past GOP.

Figure 8:
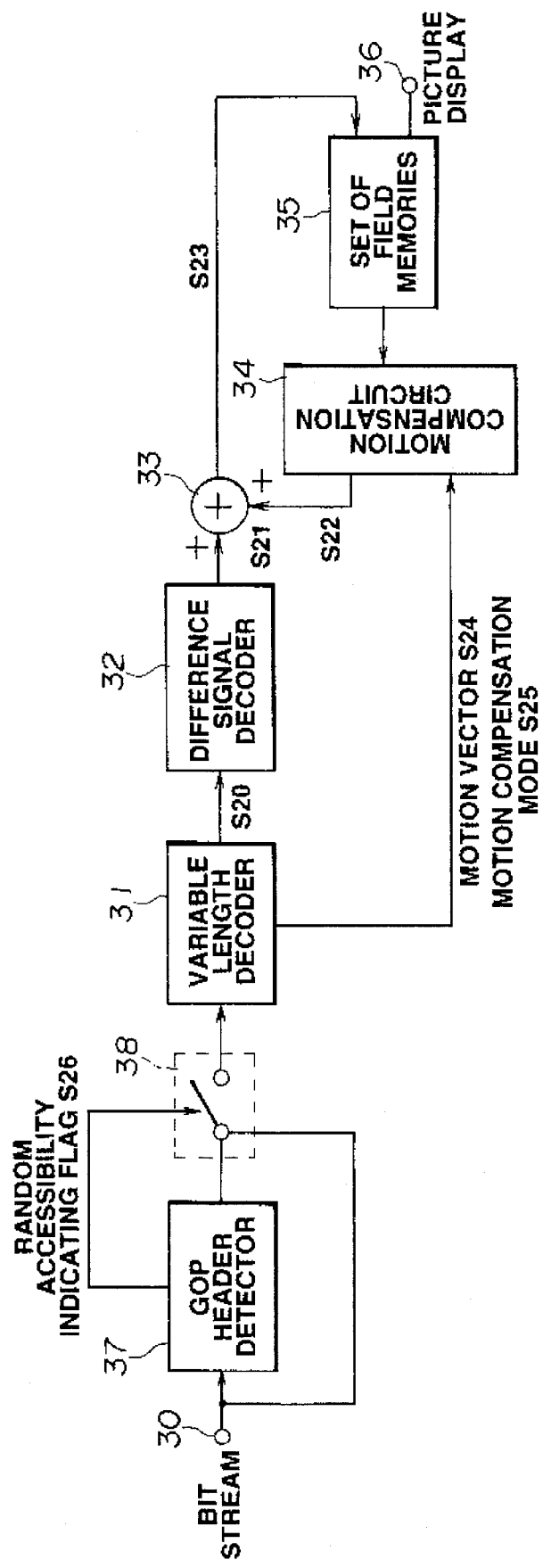
FIG. 8 is a schematic block circuit diagram showing a picture decoding device embodying the present invention.

Thus, referring to FIG. 8, the picture decoding device of the present embodiment for carrying out the picture decoding method of the present embodiment, includes a header detector 37 for detecting the header information appended to the GOP from the input bitstream mainly composed of encoded difference signals supplied at a terminal 30, that is a bitstream corresponding to the output of the terminal 20 in FIG. 4, and also detecting the random accessibility indicating flag S26 contained in the header information for deciding whether or not random accessing to the GOP is possible. The picture decoding device also includes a variable length decoder 31 having variable length decoding means supplied with the input bitstream when random accessing is determined to be possible by the header detector 37 and inverse quantization means for inverse-quantizing the output of the decoding means for outputting inverse quantization coefficients, a difference signal decoding unit 32 as inverse-transformation means for inverse transformation of the inverse quantization coefficients from the variable length decoding unit 31 for forming a decoded difference signal (a block reproduction signal S21) and an additive node 33 for adding a predicted picture signal (a block picture signal S22 from the motion compensation circuit 34) as later described to the block reproduction signal S21 from the difference signal decoder 32.

The manner in which random accessing is had on the picture decoding device of the present embodiment shown in FIG. 8 is hereinafter explained. The GOP header detector 37 of the decoding device first retrieves the GOP header of the designated GOP from the input bitstream supplied at the terminal 30 to check the random accessibility indicating flag S26 appended to the GOP header. The random accessibility indicating flag S26 corresponds to the random accessibility indicating flag S26 shown in FIG. 4.

If random accessing is found to be impossible from the random accessibility indicating flag S26, the random accessible GOPs temporally closest to the designated GOP are retrieved one after another.

If random accessing is found to be possible from the random accessibility indicating flag S26, it is found that, in the case of the GOP constructions as shown in X, Y and Z in FIGS. 5 and 6, prediction from the pictures belonging to past GOPs is not made.

The input bitstream is supplied in this case to the variable length decoder 31 via the switch 38 the state of which is changed over depending on the random accessibility indicating flag S26. The variable length decoder 31 decodes a coding difference signal S20, a motion vector S24 and a motion compensation mode signal S25, corresponding to the coding difference signal S4, motion vector S7 and the motion compensation mode signal S9 in the picture encoding device shown in FIG. 4, respectively.

The coding difference signal S20 is supplied to a difference signal decoder 32 where it is decoded to a block reproduction difference signal S21 corresponding to the block reproduction difference signal S5 shown in FIG. 4.

Meanwhile, the difference signal decoder 32 may be made up of an inverse quantization unit and an inverse discrete cosine transformation unit for matching with the above-described picture encoding device. However, a construction other than this may be employed if matching with the picture encoding device is established.

The block reproduction difference signal S21 is transmitted to an additive node 33 where a block picture signal S22 formed in a motion compensation circuit 34 based on the motion vector S24 and the motion compensation mode signal S25 from the variable length decoder 31 and an output of the set of field memories 35 is added to the block reproduction difference signal S21 from pixel to pixel to produce a block reproduction signal S23. The block reproduction signal S23 is transmitted to the set of field memories 35 for storage in a designated one of the field memories. However, as for the blocks of the P-pictures and the B-pictures for which the intra-coding mode is selected, and the totality of the blocks of the I-pictures, addition of the block reproduction signal S21 to the block pixel signal S22 is not performed and the block reproduction difference signal S21 itself is transmitted as the block reproduction signal S23 to the set of field memories 35.

The playback picture stored in the set of field memories 35 are subsequently outputted at an output terminal 36 and supplied to, for example, a picture display system.

In this manner, random accessing on the GOP basis may be achieved in the present picture decoding device (motion compensation and prediction decoding device).

Meanwhile, the switch 38 is normally closed if, for enabling random accessing to all of the GOPs, prediction from P-pictures belonging to the past GOPs is inhibited at all times.

Meanwhile, in the above-described embodiment, as shown in FIG. 7, extension _start _code is followed by "closed _prediction flag" and "reserved _bits" as the information indicating whether or not the P-picture is predicted using pictures belonging to a temporally previous GOP. However, it is also possible to employ closed _gop for this purpose.

Although not shown, the encoded data or the like formed in the above-described picture encoding device may also be stored in a picture recording medium, such as a magneto-optical disc, magnetic tape, optical disc, semiconductor memory or an IC card so as to be read from the recording medium in the above-described picture decoding device.

While specific embodiments of the invention have been shown and disclosed, it is to be understood that numerous changes and modifications may be made by those skilled in the art without departing from the scope and intent of the invention.

What is claimed is:

1. A method for encoding a video signal representing a plurality of frames each formed from first and second fields, said method comprising the steps of:

generating a predicted picture signal of a second field of a respective frame using only a decoded signal of a first field of the respective frame when the first field of the respective frame is an intra-coded field (I-field) and the second field of the respective frame is a predicted-coded field (P-field), taking a difference between the predicted picture signal and a signal based on the second field of the respective frame for generating a difference signal, and encoding said difference signal.

2. The picture encoding method as claimed in claim 1 wherein said predicted picture signal and the signal based on said second field are block-based signals each made up of plural pixels.

3. The picture encoding method as claimed in claim 1 wherein said first field is a first intra-coded picture in a group of plural pictures and said second field is a first predictive-coded picture in the group of plural pictures.

4. A picture encoding method comprising the steps of:

generating a predicted picture signal using one of: (i) a locally decoded signal of an intra-coded first field of a first group and a locally decoded signal of a field belonging to a second group which is temporally previous to said first group, and (ii) only the locally decoded signal of the intra-coded first field, taking a difference between the predicted picture signal and a signal based on a second field making up a frame along with said first field for generating a difference signal, and encoding said difference signal and a flag indicating whether said encoding is made using only the locally decoded signal of the intra-coded first field or the locally decoded signal of the intra-coded first field of the first group and the locally decoded signal of the field belonging to the second group.

5. The picture encoding method as claimed in claim 4 wherein said predicted picture signal and the signal based on said second field are block-based signals each made up of plural pixels.

6. The picture encoding method as claimed in claim 4 wherein said first field is a first intra-coded picture in a group of plural pictures and said second field is a first predictive-coded picture in the group of plural pictures.

7. A method for decoding an encoded video signal representing a plurality of frames each formed from first and second fields, said method comprising the steps of:

generating a predicted picture signal using only a locally decoded signal of an intra-coded field (I-field) when the first field of a respective frame is the I-field and the second field of the respective frame is a predicted-coded field (P-field), and adding a signal based on an encoded signal of the second field of the respective frame to the predicted coded signal for decoding said second field.

8. The picture decoding method as claimed in claim 7 wherein said predicted picture signal and the signal based on said second field are block-based signals each made up of plural pixels.

9. The picture decoding method as claimed in claim 7 wherein said first field is a first intra-coded picture in a group of plural pictures and said second field is a first predictive-coded picture in the group of plural pictures.

10. A picture decoding method comprising the steps of:

decoding a flag indicating whether encoding is made using (i) a locally decoded signal of an intra-coded first field of a first group and a locally decoded signal of a field belonging to a second group which is temporally previous to said first group, or (ii) only the locally decoded signal of the intra-coded first field, generating a predicted picture signal using only the locally decoded signal of the intra-coded first field if said flag indicates that said encoding is made using only the locally decoded signal of the intra-coded first field, and adding a signal based on an encoded signal of a second field making up a frame along with said first field to said predicted picture signal for decoding said second field.

11. The picture decoding method as claimed in claim 10 wherein said predicted picture signal and the signal based on said second field are block-based signals each made up of plural pixels.

12. The picture decoding method as claimed in claim 10 wherein said first field is a first intra-coded picture in a group of plural pictures and said second field is a first predictive-coded picture in the group of plural pictures.

13. A device for encoding a video signal representing a plurality of frames each formed from first and second fields, said device comprising:

means for generating a predicted picture signal of a second field of a respective frame using only a decoded signal of a first field of the respective frame when the first field of the respective frame is an intra-coded field (I-field) and the second field of the respective frame is a predicted-coded field (P-field), subtraction means for taking a difference between the predicted picture signal and a signal based on the second field of the respective frame for generating a difference signal, and means for encoding said difference signal.

14. The encoding device as claimed in claim 13 wherein said predicted picture signal and the signal based on said second field are block-based signals each made up of plural pixels.

15. The encoding device as claimed in claim 13 wherein said first field is a first intra-coded picture in a group of plural pictures and said second field is a first predictive-coded picture in the group of plural pictures.

16. A picture encoding device comprising:

means for generating a predicted picture signal using one of: (i) a local decoded signal of an intra-coded first field of a first group and a local decoded signal of a field belonging to a second group which is temporally previous to said first group, and (ii) only the local decoded signal of the intra-coded first field, subtraction means for taking a difference between the predicted picture signal and a signal based on a second field making up a frame along with said first field for generating a difference signal, and means for encoding said difference signal and a flag indicating whether said encoding has been made using only the local decoded signal of the intra-coded first field or the local decoded signal of the intra-coded first field of the first group and the local decoded signal of the field belonging to the second group.

17. The encoding device as claimed in claim 16 wherein said predicted picture signal and the signal based on said second field are block-based signals each made up of plural pixels.

18. The encoding device as claimed in claim 16 wherein said first field is a first intra-coded picture in a group of plural pictures and said second field is a first predictive-coded picture in the group of plural pictures.

19. A device for decoding an encoded video signal representing a plurality of frames each formed from first and second fields, said device comprising:

means for generating a predicted picture signal using only a locally decoded signal of an intra-coded field (I-field) when the first field of a respective frame is the I-field and the second field of the respective frame is a predicted-coded field (P-field), and addition means for adding said prediction picture signal and a signal based on an encoded signal of the second field of the respective frame.

20. The decoding device as claimed in claim 19 wherein said predicted picture signal and the signal based on said second field are block-based signals each made up of plural pixels.

21. The decoding device as claimed in claim 19 wherein said first field is a first intra-coded picture in a group of plural pictures and said second field is a first predictive-coded picture in the group of plural pictures.

22. A picture decoding device comprising:

means for decoding a flag indicating whether encoding has been made using (i) a locally decoded signal of an intra-coded first field of a first group and a locally decoded signal of a field belonging to a second group which is temporally previous to said first group, or (ii) only the locally decoded signal of the intra-coded first field, means for generating a predicted picture signal using only the locally decoded signal of the intra-coded first field if said flag indicates that said encoding is made using only the locally decoded signal of the intra-coded first field, and means for adding said predicted picture signal and a signal based on an encoded signal of a second field making up a frame along with said first field.

23. The decoding device as claimed in claim 22 wherein said predicted picture signal and the signal based on said second field are block-based signals each made up of plural pixels.

24. The decoding device as claimed in claim 22 wherein said first field is a first intra-coded picture in a group of plural pictures and said second field is a first predictive-coded picture in the group of plural pictures.

25. A bitstream representing a plurality of frames each formed from first and second fields, said bitstream produced by the steps of:

generating a predicted picture signal of a second field of a respective frame using only a decoded signal of a first field of the respective frame when the first field of the respective frame is an intra-coded field (I-field) and the second field of the respective frame is a predicted-coded field (P-field), taking a difference between the predicted picture signal and a signal based on the second field of the respective frame for generating a difference signal, and encoding said difference signal.

26. A bitstream produced by the steps of:

generating a predicted picture signal using one of: (i) a local decoded signal of an intra-coded first field of a first group and a local decoded signal of a field belonging to a second group which is temporally previous to said first group, and (ii) only the local decoded signal of the intra-coded first field, taking a difference between the predicted picture signal and a signal based on a second field making up a frame along with said first field for generating a difference signal, and encoding said difference signal and a flag indicating whether encoding has been made using only the local decoded signal of the intra-coded first field or the local decoded signal of the intra-coded first field of the first group and the local decoded signal of the field belonging to the second group.

* * * * *